(12) United States Patent
Ahn et al.

(10) Patent No.: US 9,199,671 B1
(45) Date of Patent: Dec. 1, 2015

(54) FOLDING UNIT FOR FOLDABLE VEHICLE

(71) Applicant: HYUNDAI MOTOR COMPANY, Seoul (KR)

(72) Inventors: Gwang Hyun Ahn, Yongin-si (KR); Yong Woo Lee, Namyangju-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/558,308

(22) Filed: Dec. 2, 2014

(30) Foreign Application Priority Data

Jul. 9, 2014 (KR) .................... 10-2014-0085906

(51) Int. Cl.
*B62D 31/00* (2006.01)
*B62D 21/14* (2006.01)

(52) U.S. Cl.
CPC .............. *B62D 31/006* (2013.01); *B62D 21/14* (2013.01)

(58) Field of Classification Search
CPC ...... B62D 21/14; B62D 27/06; B62D 31/006; B62D 39/00
USPC .......... 296/26.02, 26.04, 26.05, 26.06, 26.07, 296/26.08, 26.09, 26.1, 26.11; 280/639
See application file for complete search history.

(56) References Cited

U.S. PATENT DOCUMENTS

| 3,850,472 | A | * | 11/1974 | Greppi | ................ 296/26.11 |
| 4,089,542 | A | * | 5/1978 | Westerman | ............... 280/639 |
| 2013/0240274 | A1 | | 9/2013 | Vitale et al. | |
| 2014/0202780 | A1 | * | 7/2014 | Lark et al. | ................ 180/65.1 |

FOREIGN PATENT DOCUMENTS

| JP | 2003-054441 A | 2/2003 |
| JP | 2013-112096 A | 6/2013 |
| KR | 2014-0028725 A | 3/2014 |
| KR | 2014-0029836 A | 3/2014 |

* cited by examiner

*Primary Examiner* — Jason S Daniels
(74) *Attorney, Agent, or Firm* — McDermott Will & Emery LLP

(57) ABSTRACT

A folding unit for a foldable vehicle comprises a floor part configured including a front floor provided with a front wheel and a rear floor provided with a rear wheel. The front floor and the rear floor overlap each other or extend by being slid to each other to extend or contract a wheelbase of the vehicle. A rear cabin part is disposed at a rear side of the vehicle to form a dome shaped cabin and has a lower end hinge-coupled with the floor part to rotate in a front and rear direction of the vehicle. A folding driver includes a linear motor rotating while being hinge-coupled with the floor part. An operating rod is extended or contracted from the linear motor and has an end hinge-coupled with a lower end of the rear cabin part.

7 Claims, 5 Drawing Sheets

FOLDING UNIT FOR FOLDABLE VEHICLE

CROSS REFERENCE TO RELATED APPLICATION

The present application claims the benefit of priority to Korean Patent Application No. 10-2014-0085906, filed Jul. 9, 2014, the entire contents of which is incorporated herein for all purposes by this reference.

TECHNICAL FIELD

The present disclosure relates to a folding unit for a foldable vehicle capable of minimally occupying a space due to folding at the time of parking and forming a complete vehicle body when unfolding.

BACKGROUND

A one-person microcar has been introduced with the development of an electric vehicle and the like.

The microcar may be designed to be foldable to minimally occupy a parking space particularly for long-term parking.

However, in the case of the traditional folding vehicle, it is difficult to change a wheelbase, and therefore, the wheelbase occupies a lot of space even at the time of folding. A roof or a rear side cannot be completely folded, and therefore, an overall length is not minimized even at the time of folding. Further, even if the roof or the rear is folded, an overall height of the vehicle is rather increased and the roof or the rear protrudes upwards at the time of folding, and therefore, it is difficult to park the vehicle in a parking space having a narrow height.

Therefore, a folding structure to maximally contract the wheelbase, completely fold the roof and the rear, and prevent the overall height from increasing is necessary.

The matters described as the related art have been provided only for assisting in the understanding for the background of the present disclosure and should not be considered as corresponding to the related art known to those skilled in the art.

SUMMARY

An aspect of the present inventive concept provides a new concept folding unit for a foldable vehicle capable of minimally occupying a space due to folding at the time of parking and forming a complete vehicle body at the time of unfolding.

According to an exemplary embodiment of the present inventive concept, a folding unit for a foldable vehicle comprises a floor part including a front floor provided with a front wheel and a rear floor provided with a rear wheel. The front floor and the rear floor overlap each other or extend by being slid to each other to extend or contract a wheelbase of the vehicle. A rear cabin part is disposed at a rear side of the vehicle to form a dome shaped cabin and has a lower end hinge-coupled with the floor part to rotate in a front and rear direction of the vehicle. A folding driver includes a linear motor rotating while being hinge-coupled with the floor part and an operating rod extended or contracted from the linear motor. The operating rod has one end hinge-coupled with a lower end of the rear cabin part.

The rear cabin part may be coupled with a rear portion of the front floor and the folding driver may be provided at the front floor.

The operating rod may be hinge-coupled with the lower end of the rear cabin part to rotate the rear cabin part in the front and rear direction of the vehicle when the operating rod extends or contracts.

The linear motor may have a front end hinge-coupled with the front floor to rotate based on the front floor depending on a rotation of the rear cabin part.

The rear cabin part may be coupled with the front floor through a hinge shaft. The hinge shaft may have an extending part extended forward, and an end of the extending part may be hinge-coupled with the one end of the operating rod.

The hinge shaft of the rear cabin part may have a support panel which extends backward and the support panel may be coupled with the lower portion of the rear cabin part.

The rotating shaft may rotate by pressing the extending part when the operating rod is extended, and at the same time, the support panel may press the rear cabin part upwardly.

BRIEF DESCRIPTION OF THE DRAWINGS

The above and other objects, features and advantages of the present disclosure will be more clearly understood from the following detailed description taken in conjunction with the accompanying drawings.

DETAILED DESCRIPTION

Hereinafter, exemplary embodiments of the present inventive concept will be described with reference to the accompanying drawings.

Figure 3:
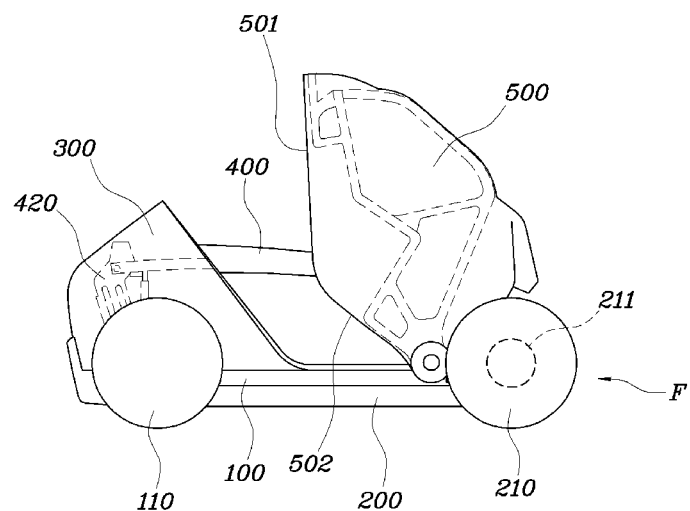
Figure 4:
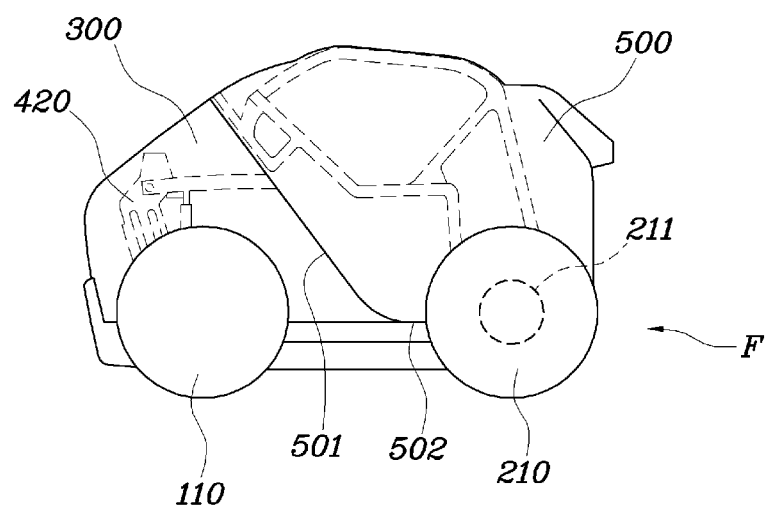
Figure 5:
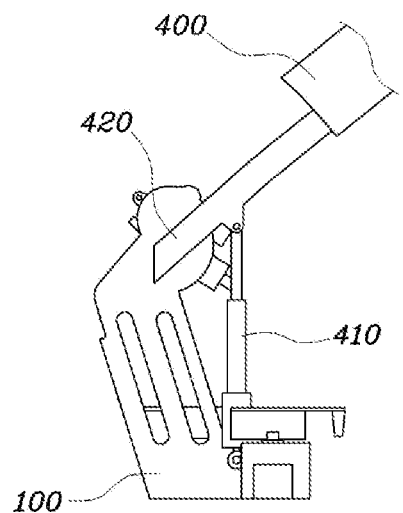
FIG. 5 is a view illustrating an operation structure of a windshield part of the foldable vehicle according to the exemplary embodiment of the present inventive concept.
Figure 6:
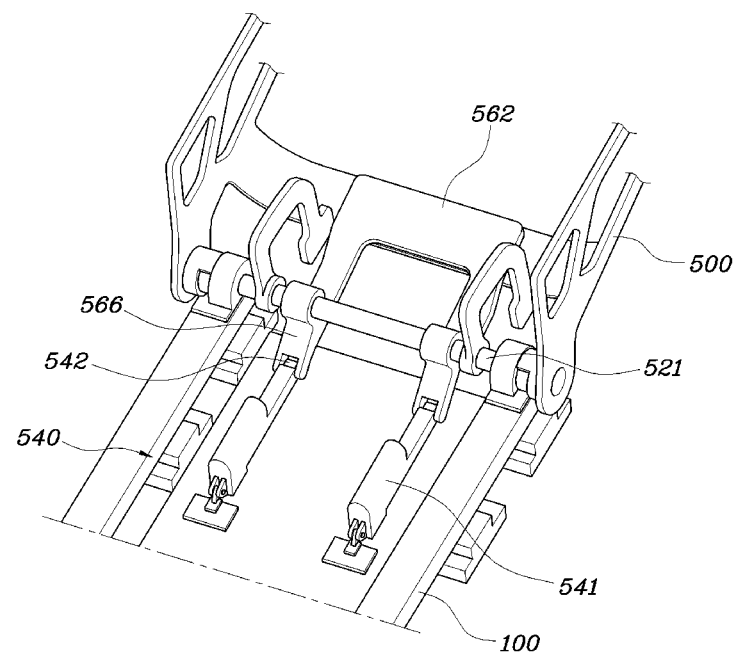
FIG. 6 is a view illustrating a folding unit for a foldable vehicle according to an exemplary embodiment of the present inventive concept.
Figure 7:
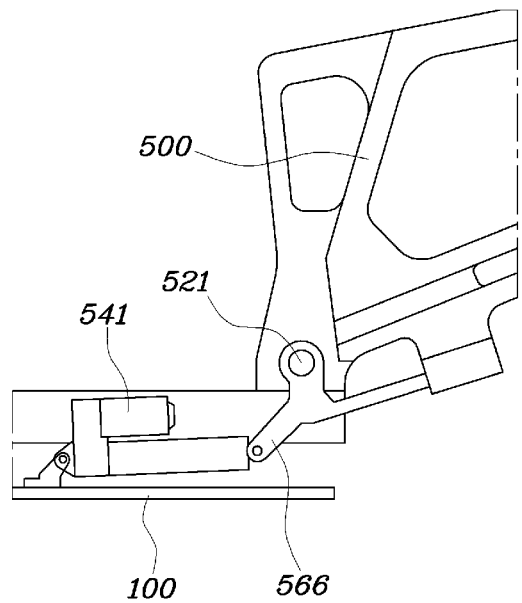
FIGS. 7 to 9 are views illustrating an operation process of a folding unit for a foldable vehicle according to an exemplary embodiment of the present inventive concept.
Figure 8:
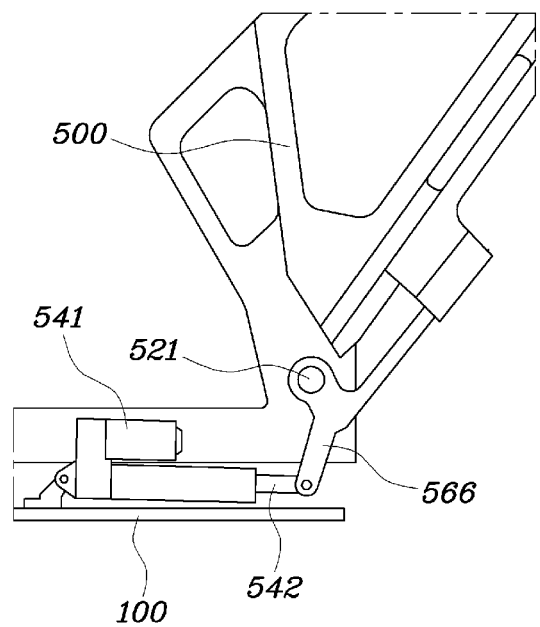
Figure 9:
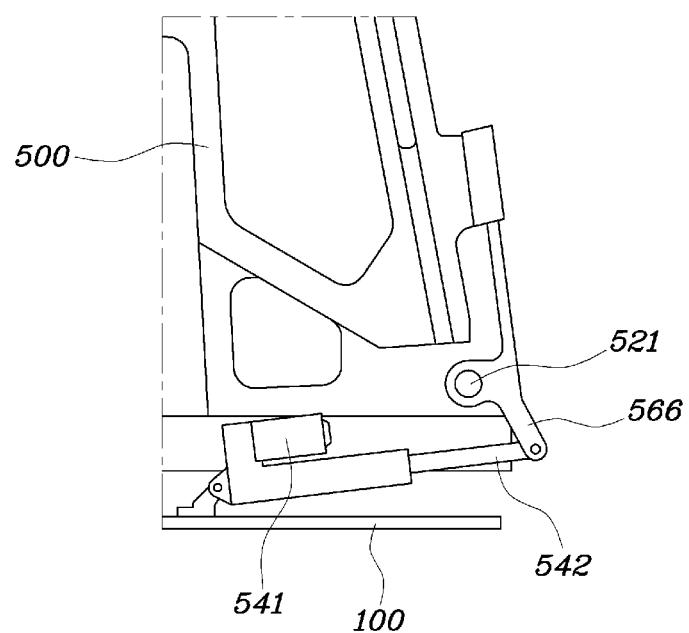

FIGS. 1 to 4 are views illustrating the overall operation process of a foldable vehicle according to an exemplary embodiment of the present inventive concept, FIG. 5 is a view illustrating an operation structure of a windshield part of the foldable vehicle according to the exemplary embodiment of the present inventive concept, FIG. 6 is a view illustrating a folding unit for a foldable vehicle according to an exemplary embodiment of the present inventive concept, and FIGS. 7 to 9 are views illustrating an operation process of a folding unit for a foldable vehicle according to an exemplary embodiment of the present inventive concept.

The foldable vehicle according to the exemplary embodiment of the present inventive concept includes a floor part F configured to include a front floor 100 provided with a front wheel 110 and a rear floor 200 provided with a rear wheel 210, in which the front floor 100 and the rear floor 200 overlap each other or are extended by being slid to each other to extend or contract a wheelbase of a vehicle. A windshield part 400 includes a windshield glass 401 and a lower end 420 hinge-coupled with a front portion of the front floor 100 to rotate in a front and rear direction of the vehicle. A rear cabin part 500 is disposed at a rear side of the vehicle to form a cabin in a dome shape and has a lower end hinge-coupled with the floor part F to rotate in the front and rear direction of the vehicle. A roof part 600 has a link structure in which a front end of the roof part 600 is hinge-coupled with an upper end of the windshield part 400, and a rear end of the roof part 600 is hinge-coupled with an upper end of the rear cabin part 500. The windshield part 400 and the rear cabin part 500 are folded into the vehicle to be inside the vehicle, and n the windshield part 400 and the rear cabin part 500 are unfolded to an outside of the vehicle to be exposed to the outside.

The floor part F includes the front floor 100 provided with the front wheel 110 and the rear floor 200 provided with the rear wheel 210. The front floor 100 and the rear floor 200 overlap each other or are extended by being slid to each other to extend or contract the wheelbase of the vehicle.

The front floor 100 is provided with the windshield glass 401 like a general vehicle. The windshield glass 401 is mounted on the windshield part 400, and the windshield part 400 has the lower end 420 hinge-coupled with the front portion of the front floor 100 to rotate in the front and rear direction of the vehicle. Therefore, the vehicle may be driven by folding the windshield backward when the vehicle is folded, and unfolding the windshield forward when the vehicle is unfolded.

The rear cabin part 500 is provided at a rear side of the vehicle to form a cabin in a dome shape and has the lower end hinge-coupled with the floor part F of the front floor 100 or the rear floor 200 to rotate in the front and rear direction of the vehicle. The following exemplary embodiment describes a state in which the rear cabin part 500 is coupled with a rear portion of the front floor 100.

The roof part 600 has a link structure in which the front end of the roof part 600 is hinge-coupled with the upper end of the windshield part 400, and the rear end thereof is hinge-coupled with the upper end of the rear cabin part 500. The roof part 600 is folded together with the windshield part 400 when the windshield part 400 is folded and directs to an inner space of the rear cabin part 500. Further, when the rear cabin part 500 is folded into the vehicle, both the windshield part 400 and the roof part 600 are positioned in the vehicle, that is, the inner space of the rear cabin part 500. When the windshield part 400 and the rear cabin part 500 are unfolded to the outside of the vehicle, the roof part 600 is also exposed to the outside as a roof of the vehicle.

Therefore, in the foldable vehicle according to the exemplary embodiment of the present inventive concept, the wheelbase extends and contracts, and the windshield and the roof are inserted into the cabin when the wheelbase contracts and the cabin rotates to cover the vehicle to reduce a space horizontally and vertically.

Figure 1:
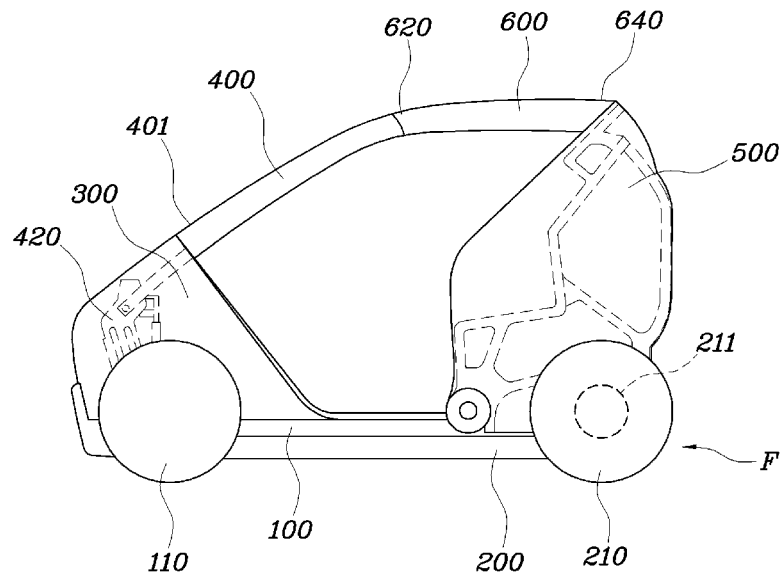
FIGS. 1 to 4 are views illustrating an overall operation process of a foldable vehicle according to an exemplary embodiment of the present inventive concept.
Figure 2:
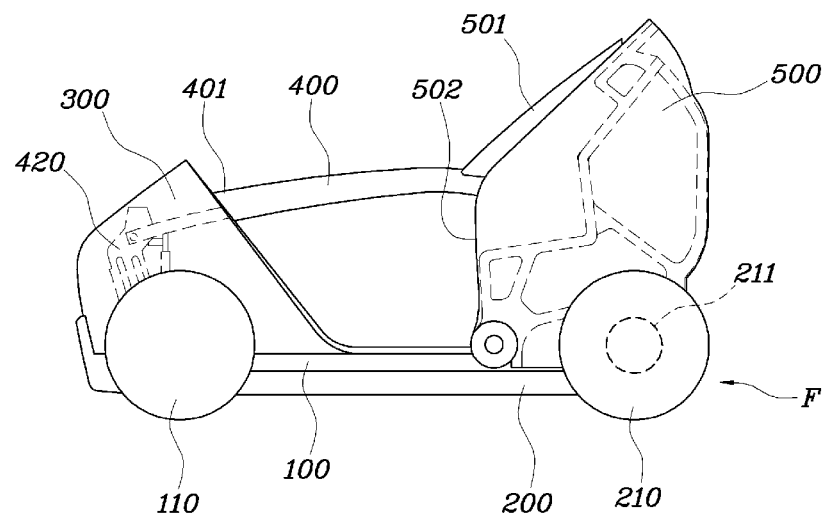

FIGS. 1 to 4 illustrate a process of folding. First, as illustrated in FIG. 2, the windshield part 400 is folded, and thus, the roof part 600 enters inside the vehicle. When the windshield part 400 is folded, the windshield part 400 and the roof part 600 bend to form an acute angle, and thus may be folded so that a vertex at which the windshield part 400 meets the roof part 600 directs toward the rear cabin part 500.

Next, as illustrated in FIG. 3, the rear cabin part 500 rotates forward and covers the windshield part 400 and the roof part 600 together, and at the same time, the rear floor 200 slides forward by driving the rear wheel 210 and overlaps the front floor 100 to contract the wheelbase. Here, a folding driver 540 (refer to FIG. 6) rotates the rear cabin part 500 in the front and rear direction of the vehicle. Further, a rear wheel driver 211 drives the rear wheel 210 when the vehicle is folded to slide the rear floor 200 to the front floor 100 to contract the wheelbase.

Finally, the folding is completed form as illustrated in FIG. 4 to reduce the overall height and length of the vehicle. For unfolding, the process is performed reversely to unfold the vehicle.

As illustrated in FIG. 5, a front driver 410 rotates the windshield part 400 in the front and rear direction of the vehicle. In detail, the front driver 410 may be a linear actuator which has a lower end coupled with the front floor 100 and an upper end coupled with the windshield part 400 to push or pull the windshield part 400 so as to rotate the windshield part 400.

That is, the front driver 410 rotating the windshield part 400 in the front and rear direction of the vehicle, the folding driver 540 rotating the rear cabin part 500 in the front and rear direction of the vehicle, and the rear wheel driver 211 driving the rear wheel 210 when the vehicle is folded to slide the rear floor 200 to the front floor 100 to contract the wheel base are provided. The front driver 410 is first driven when the vehicle is folded to bend the windshield part 400 and the roof part 600 into the vehicle and then drive the folding driver 540 and the rear wheel driver 211 to perform the folding. Further, the windshield part 400 and the roof part 600 may be received into a cabin space inside the rear cabin part 500 at the time of the driving of the folding driver 540.

The folding driver 540 and the rear wheel driver 211 are driven together to contract the wheel base, and the windshield part 400 and the roof part 600 may be completely received into the rear cabin part 500, thereby, reducing folding time. The rear cabin part 500 contacts a rear end of a hood 300 of the vehicle at the time of folding to completely cover the vehicle.

The rear cabin part 500 may be a shielding surface covering the cabin, a first adhering part 501 adhering the rear end of the hood 300 of the vehicle at the time of folding, and a second adhering part 502 adhering the floor part F of the vehicle at the time of folding. Thereby, it is possible to prevent outside pollution and protect the vehicle from a theft and the like in a state in which the folding is completed as illustrated in FIG. 4.

Further, when the vehicle is folded and then unfolded, to the contrary, the folding driver 540 and the rear wheel driver 211 are first driven to rotate the rear cabin part 500 backward while extending the wheelbase and drive the front driver 410 to unfold the windshield part 400 and the roof part 600 to the outside.

FIG. 6 is a view illustrating a folding unit for a foldable vehicle according to an exemplary embodiment of the present inventive concept, and FIGS. 7 to 9 are views illustrating an operation process of a folding unit for a foldable vehicle according to an exemplary embodiment of the present inventive concept.

The folding unit for a foldable vehicle according to the exemplary embodiment of the present inventive concept comprises the floor part F as shown in FIG. 1 including the front floor 100 provided with the front wheel 110 and the rear floor 200 provided with the rear wheel 210, in which the front floor 100 and the rear floor 200 overlap each other or are extended by being slid to each other to extend or contract the wheelbase of the vehicle. The rear cabin part 500 is disposed at the rear side of the vehicle to form the cabin in the dome shape and has the lower end hinge-coupled with the floor part F to rotate in the front and rear direction of the vehicle. The folding driver 540 includes a linear motor 541 rotating while being hinge-coupled with the floor part F. An operating rod 542 is extended or contracted from the linear motor 541 and has an end hinge-coupled with the lower end of the rear cabin part 500.

That is, the floor part F according to the exemplary embodiment of the present inventive concept has the front floor 100 provided with the front wheel 110 and the rear floor 200 provided with the rear wheel 210. Here, the front floor 100 and the rear floor 200 overlap each other or are extended by being slid to each other to extend or contract the wheelbase of the vehicle. The rear floor 200 is slid forward at the time of folding to overlap the front floor 100 and is unfolded reversely at the time of unfolding to form a complete floor of the vehicle.

The rear cabin part 500 is disposed at the rear side of the vehicle to form the cabin in the dome shape. Further, the rear cabin part 500 has the lower end hinge-coupled with the floor part F to rotate in the front and rear direction of the vehicle. Therefore, when the vehicle is unfolded, the rear floor 200 is slid backward, and at the same time, the rear cabin part 500 rotates backward to form the rear cabin. When the vehicle is folded, the rear cabin part 500 rotates forward together with the rear floor 200 to remove the rear cabin and be folded to the floor.

The folding driver 540 includes the linear motor 541 rotating while being hinge-coupled with the floor part F and the operating rod 542 extended or contracted from the linear motor 541 and having the end hinge-coupled with the lower end of the rear cabin part 500. That is, when the linear motor 541 of the folding driver 540 is operated to extend the operating rod 542, the lower end of the rear cabin part 500 is pressed backward to rotate the rear cabin part 500 forward.

Referring to FIG. 6, the rear cabin part 500 may be coupled with the rear portion of the front floor 100, and the folding driver 540 may be provided at the front floor 100. That is, the rear floor 200 is slid to extend and contract the wheelbase and the rear cabin part 500 is provided at the rear of the front floor 100 to maintain the minimum wheelbase when the floor part F is contracted.

Further, the operating rod 542 is hinge-coupled with a lower portion based on a point hinge-coupled with the front floor 100 in the rear cabin part 500 to rotate the rear cabin part 500 in the front and rear direction of the vehicle when the operating rod 542 is extended or contracted. That is, the operating rod 542 is pressed or pulled at the lower portion based on the hinge-coupled point to rotate the rear cabin part 500 forward at the time of the pressing and backward at the time of pulling.

FIGS. 7 to 9 illustrate the folding process. The linear motor 541 has a front end hinge-coupled with the front floor 100 to rotate based on the front floor 100 depending on the rotation of the rear cabin part 500. That is, since a connection point of the operating rod 542 is also rotated at the time of the rotation of the rear cabin part 500, to absorb a change in an angle depending on the rotation, the linear motor 541 has the front end hinge-coupled with the front floor 100 to rotate based on the front floor 100 depending on the rotation of the rear cabin part 500.

Further, the rear cabin part 500 is coupled with the front floor 100 through a hinge shaft 521, the hinge shaft 521 is provided with an extending part 566 extended forward, and an end of the extending part 566 may be hinge-coupled with the end of the operating rod 542. Therefore, the angle of the linear motor 541 is changed based on the front floor 100, and the connection angle of the operating rod 542 is also changed based on the rear cabin part 500, such that the linear motor 541 and the operating rod 542 may rotate with the rear cabin part 500.

Further, as illustrated in FIG. 6, the hinge shaft 521 of the rear cabin part 500 is provided with a support panel 562 which extends backward, and the support panel 562 may be coupled with the lower portion of the rear cabin part 500. Thereby, the hinge shaft 521 rotates by pressing the extending part 566 when the operating rod 542 is extended, and at the same time, the support panel 562 may press the rear cabin part 500 upwardly. Thereby, it is possible to stably support the rear cabin part 500 at the time of folding or in a unfolded state.

As described above, according to the folding unit for a foldable vehicle according to the exemplary embodiment of the present inventive concept, it is possible to exhibit an optimal effect in a congested area by parking in a narrow parking space.

Further, it is possible to facilitate driving by reducing the wheelbase, and thus reducing the rotating radius.

In addition, it is possible to sufficiently park a vehicle even at the area where a height of a roof is low by lowering the overall height at the time of parking.

In particular, it is possible to achieve stable folding and unfolding by folding or unfolding the rear cabin using a linear actuator.

Although the present inventive concept has been shown and described with respect to specific exemplary embodiments, it will be obvious to those skilled in the art that the present disclosure may be variously modified and altered without departing from the spirit and scope of the present disclosure as defined by the following claims.

What is claimed is:

1. A folding unit for a foldable vehicle, comprising:
   a floor part including a front floor provided with a front wheel and a rear floor provided with a rear wheel, the front floor and the rear floor overlapping each other or being extended by being slid to each other to extend or contract a wheelbase of the vehicle;
   a rear cabin disposed at a rear side of the vehicle to form a dome shaped cabin, a lower end of the rear cabin hinge-coupled with the floor part to rotate in a front and rear direction of the vehicle; and
   a folding driver including a linear motor rotating while being hinge-coupled with the floor part and an operating rod extending or contracting from the linear motor, one end of the operating rod hinge-coupled with the lower end of the rear cabin part.

2. The folding unit of claim 1, wherein the rear cabin part is coupled to a rear portion of the front floor and the folding driver is disposed at the front floor.

3. The folding unit of claim 2, wherein the operating rod is hinge-coupled with the lower end of the rear cabin part to rotate the rear cabin part in the front and rear direction of the vehicle when the operating rod extends or contracts.

4. The folding unit of claim 2, wherein the linear motor has a front end hinge-coupled with the front floor to rotate based on the front floor depending on a rotation of the rear cabin part.

5. The folding unit of claim 2, wherein the rear cabin part is coupled with the front floor through a hinge shaft, the hinge shaft has an extending part extended forward, and an end of the extending part is hinge-coupled with the one end of the operating rod.

6. The folding unit of claim 5, wherein the hinge shaft of the rear cabin part has a support panel which extends backward and the support panel is coupled with a lower portion of the rear cabin part.

7. The folding unit of claim 6, wherein the hinge shaft rotates by pressing the extending part when the operating rod extends, and at the same time, the support panel presses the rear cabin part upwardly.

* * * * *